United States Patent
Yui et al.

(10) Patent No.: US 11,932,779 B2
(45) Date of Patent: Mar. 19, 2024

(54) ELECTRONIC DEVICE INCLUDING FLUORESCENT PAINT

(71) Applicant: Panasonic Intellectual Property Management Co., Ltd., Osaka (JP)

(72) Inventors: Tetsunobu Yui, Osaka (JP); Motonari Ogura, Osaka (JP); Kaname Tomita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/719,809

(22) Filed: Apr. 13, 2022

(65) Prior Publication Data

US 2023/0331997 A1  Oct. 19, 2023

(51) Int. Cl.
| | |
|---|---|
| *C09D 5/14* | (2006.01) |
| *C09D 5/00* | (2006.01) |
| *C09D 5/18* | (2006.01) |
| *C09D 5/22* | (2006.01) |
| *C09D 7/61* | (2018.01) |
| *G01N 21/64* | (2006.01) |
| *G01N 21/95* | (2006.01) |
| *G06F 3/02* | (2006.01) |
| *G06F 3/041* | (2006.01) |

(52) U.S. Cl.
CPC ............ *C09D 5/14* (2013.01); *C09D 5/00* (2013.01); *C09D 5/18* (2013.01); *C09D 5/22* (2013.01); *C09D 7/61* (2018.01); *G01N 21/6447* (2013.01); *G01N 21/95* (2013.01); *G06F 3/02* (2013.01); *G06F 3/041* (2013.01)

(58) Field of Classification Search
CPC ... C09D 5/14; C09D 7/61; C09D 5/00; C09D 5/18; G09D 5/22; G01N 21/6447; G01N 21/95; G06F 3/02; G06F 3/041
See application file for complete search history.

(56) References Cited

U.S. PATENT DOCUMENTS

| | | | |
|---|---|---|---|
| 2016/0007482 A1 | 1/2016 | Schonholz | |
| 2019/0067631 A1 | 2/2019 | Guo et al. | |
| 2019/0284401 A1* | 9/2019 | Bao | C09D 7/65 |
| 2021/0352906 A1* | 11/2021 | Lin | A01N 25/34 |

FOREIGN PATENT DOCUMENTS

| | | | |
|---|---|---|---|
| EP | 3550335 | | 10/2019 |
| JP | 5-331438 | | 12/1993 |
| JP | 11-173991 | | 7/1999 |
| JP | 2017-101995 | | 6/2017 |
| JP | 2017101995 A | * | 6/2017 |
| JP | 2019-52868 | | 4/2019 |
| WO | 2019/048624 | | 3/2019 |

OTHER PUBLICATIONS

Extended European Search Report dated Dec. 20, 2022 in related European Patent Application No. 22178709.6.

\* cited by examiner

*Primary Examiner* — Hang Lin
(74) *Attorney, Agent, or Firm* — WENDEROTH, LIND & PONACK, L.L.P.

(57) ABSTRACT

An electronic device includes a housing; a functional coated film applied on a surface of the housing, the functional coated film being transparent and having a function; and a fluorescent coated film including transparent fluorescent paint and applied on a part of the functional coated film.

9 Claims, 4 Drawing Sheets

ELECTRONIC DEVICE INCLUDING FLUORESCENT PAINT

BACKGROUND

1. Technical Field

The present disclosure relates to an electronic device composing a functional coated film on a surface of a housing, and a fluorescent coated film on the functional coated film.

2. Description of the Related Art

For example, Unexamined Japanese Patent Publication No. 2017-101995 (hereafter Related Publication 1) discloses a method for inspecting the degree of wear of floor lines. The method uses a line inspection paint, which contains fluorescent paint. That line inspection paint is applied on the floor lines or on the floor surface in the vicinity of a floor line. After the floor surface has been used for a predetermined period, the degree of wear can be inspected by confirming the fluorescent emission irradiating ultraviolet light.

Unexamined Japanese Patent Publication No. H11-173991 (hereafter Related Publication 2) discloses a method for inspecting effectiveness of protection coating which is applied on a painted surface of a vehicle. The protection coating includes a fluorescent substance by dispersing it into base material of the coating. Irradiating the coating layer with ultraviolet light and confirming the fluorescence intensity, the effectiveness of protection coating can be inspected.

SUMMARY

The present disclosure provides an electronic device in which the degree of wear of a functional coated film can be inspected while taking advantage of the function of the film.

An electronic device according to the present disclosure includes a housing; a functional coated film applied on a surface of the housing, the functional coated film being transparent and having a function; and a fluorescent coated film including transparent fluorescent paint and applied on a part of the functional coated film.

According to the present disclosure, the wear degree of the functional coated film can be inspected while taking advantage of its functions.

DETAILED DESCRIPTIONS

Figure 1:
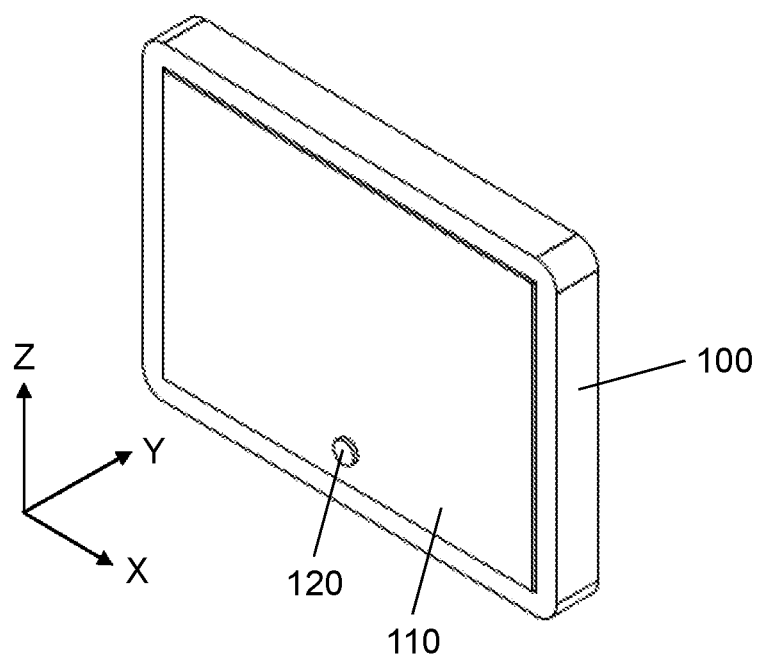
FIG. 1 is an external view of an electronic device with the configuration of the present disclosure (Example 1)

Recently, the demand for functional coatings is growing rapidly against the backdrop of the recent global COVID-19 epidemic. For example, the application of antibacterial coatings to existing products that are touched by human hands. However, the functional coated film in this disclosure is not limited to antibacterial coating. Flame retardant coatings, fingerprint resistant coatings, etc. are also applicable.

Particularly, when a functional coated film is applied on an electronic device, the coated film is often transparent. Therefore, even if the functional coated film is worn by human touch and loses its function, it is difficult to inspect the wear only by visual inspection without using tools. On the other hand, if the functional coated film is not transparent, there is no need to apply the present disclosure because the degree of wear can be inspected only by visual inspection without using tools.

The following is a supplementary explanation of the transparent color of the functional coated film that is the subject of this disclosure. For example, when applying a functional coated film on the display surface of an electronic device, it is desirable that the functional coated film be colorless and transparent. Also, when applying a functional coated film to existing products against the background of the recent COVID-19, it is desirable that the functional coated film be colorless and transparent because it can be used for existing various-color-tone products. On the other hand, the functional coated film does not necessarily need to be colorless. If the color of the functional coated film is similar to that of the applied location, it is possible to use colored transparent functional coated film because it does not affect the color tone of the electronic device.

In the Related Publication 1, a method of inspecting floor line wear by means of line inspection paints, mainly fluorescent paints, is disclosed. However, present disclosure is targeting functional coated films that function by having their coated film on the top surface. For example, antibacterial coated films. But in the Related Publication 1, a line inspection paint is applied to cover the floor line. Applying the method of the Related Publication 1 to the aforementioned functional coated films will lead to insufficient functionality of the functional coated film. Therefore, it is difficult to maintain sufficient functionality of the functional coated films by the method of Related Publication 1.

In the Related Publication 2, a method of inspecting coated film wear by dispersing a fluorescent substance into base material of the coating. However, this disclosure may cause a chemical reaction when the agents are mixed. There are two possible adverse effects that may occur due to this chemical reaction. The first is that it may interfere with the function of the functional coating itself. The other is that it may change the color tone and/or transparency of the coating. In the former case, the function of the functional coated film cannot be fully utilized. In the latter case, for example, in electronic devices that display images, the change in color tone and/or transparency can lead to a decrease in product performance. This shows that there are situations where Related Publication 2 cannot be applied.

Exemplary embodiments will be described below in detail with reference to the drawings as appropriate. However, descriptions more detailed than necessary may be omitted. For example, detailed descriptions of already well-known matters, and duplicated descriptions of substantially identical configurations may be omitted. These omissions are intended to avoid excessive redundancy in the following description, and to facilitate understanding of those skilled in the art. Note that the accompanying drawings and the following description are provided for those skilled in the art to fully understand the present disclosure, and are not intended to limit the subject matter recited in the appended claims.

Moreover, in the following exemplary embodiments, a description will be given of an example in which a cover opening and closing device is mounted on a monitor (which is an example of a display apparatus) to be attached to a passenger seat of an aircraft. However, the present disclosure is not limited to this example.

First Exemplary Embodiment

A first exemplary embodiment will be described below with reference to FIGS. 1 to 6.

[1-1. Configuration]

FIG. 1 is an external view of an example of an electronic device. The electronic device includes housing 100, functional coated film 110 applied on the surface of housing 100, and fluorescent coated film 120 applied on a part of functional coated film 110. Now, functional coated film 110 should be transparent, but both colored and colorless are acceptable as described above. Also, fluorescent coated film 120, which includes transparent fluorescent paint, should be transparent, but whether it is colored or colorless depends on the color of functional coated film 110 as follows. When functional coated film 110 is colorless and transparent, fluorescent coated film 120 also needs to be colorless and transparent. On the other hand, if functional coated film 110 is colored and transparent, fluorescent coated film 120 can take two ways. First is to be similar in color to functional coated film 110, and second is to be colorless and transparent. In this embodiment, the part of functional coated film 110 is to be worn or to be touched by a human.

Figure 2:
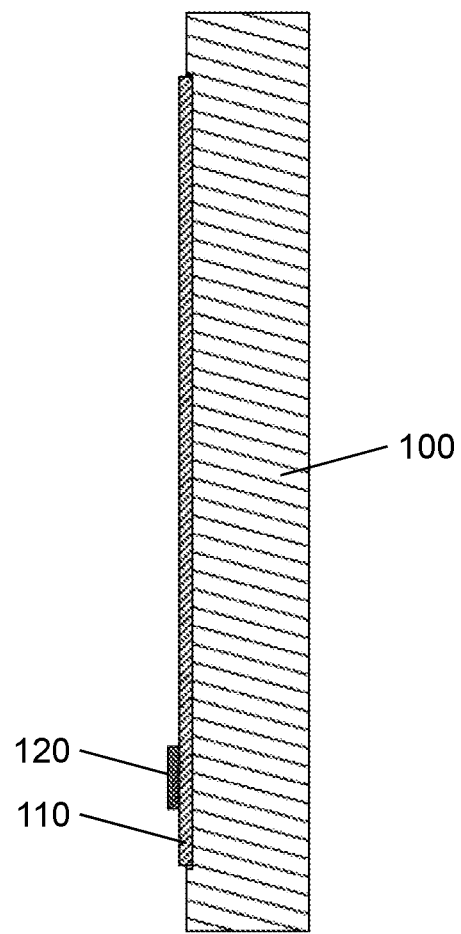
FIG. 2 is a cross sectional view of an electronic device with the configuration of the present disclosure.

FIG. 2 is the X-axis cross-sectional view of FIG. 1, including housing 100, functional coated film 110, and fluorescent coated film 120.

Functional coated film 110 may be applied to only a portion of housing 100, or it may be applied to the entire housing 100 to cover it.

Figure 3:
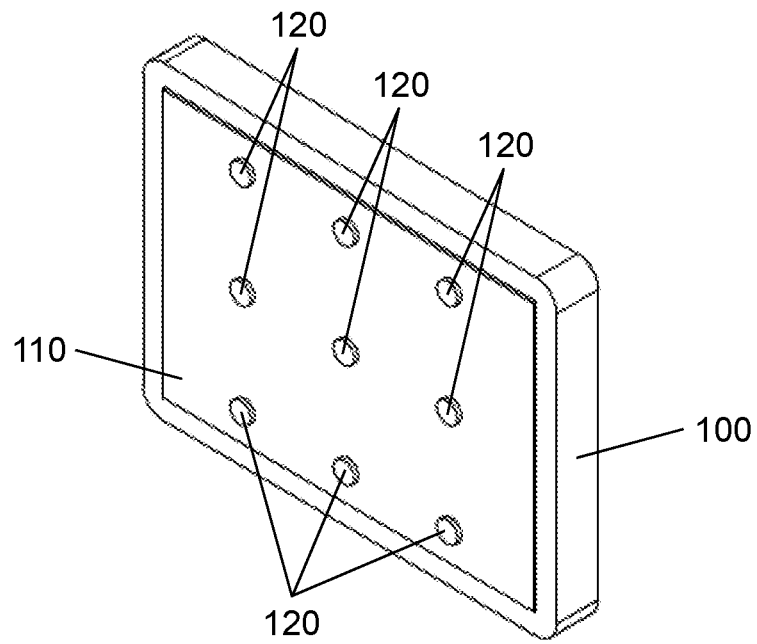
FIG. 3 is a shape of fluorescent coated film (Example 1)
Figure 4:
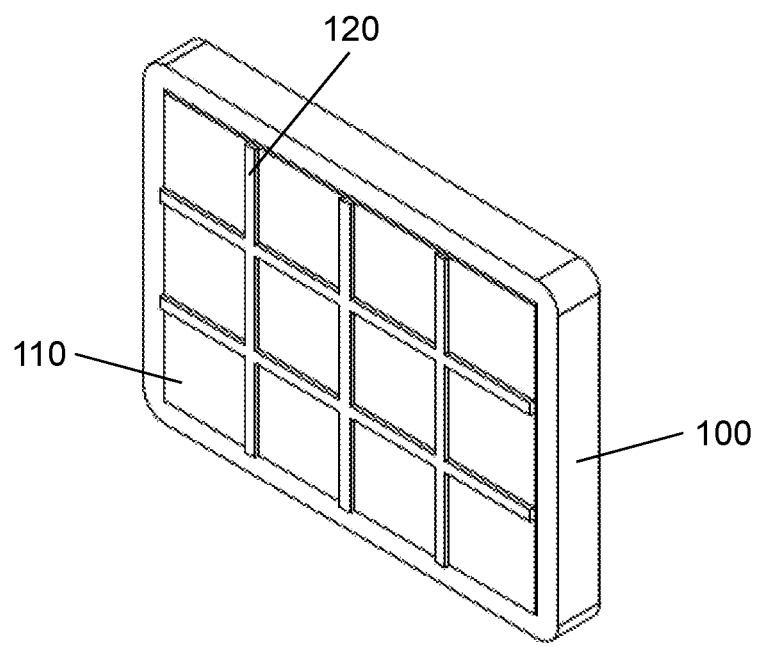
FIG. 4 is a shape of fluorescent coated film (Example 2)

Fluorescent coated film 120 does not necessarily have to be applied to only one point, as shown in FIG. 1. It can be applied in the form of dots at multiple points as shown in FIG. 3, or in the form of a grid as shown in FIG. 4. In other words, fluorescent coated film 120 has a dot shape or a linear shape.

The shape of fluorescent coated film 120 shown in FIGS. 1 and 3 is circular, but it does not necessarily have to be circular. Any polygonal shape, ellipse, or other shape such as letters or symbols are also acceptable.

The shape of fluorescent coated film 120 shown in FIG. 4 is of equal pitch and is a grid shape with straight lines perpendicular and horizontal to the product axis described in FIG. 1, but it is not necessary to satisfy these requirements. Shapes such as straight lines, diagonal lines, rectangular lines, curves, etc., which do not have equal pitch, are also acceptable.

Figure 5:
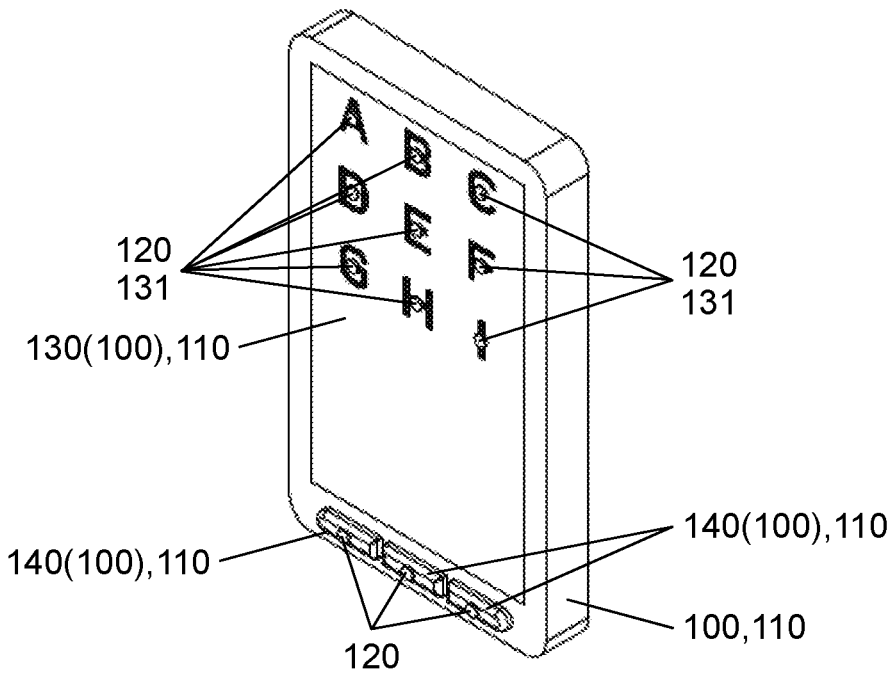
FIG. 5 is an external view of an electronic device with the configuration of the present disclosure (Example 2)

FIG. 5 is an external view of an example of an electronic device having housing 100 including touch panel display 130 and mechanical button 140, having functional coated film 110 applied to the entire surface of housing 100, and having fluorescent coated film 120 applied on icons 131 displayed on touch panel display 130 and applied on mechanical buttons 140.

Figure 6:
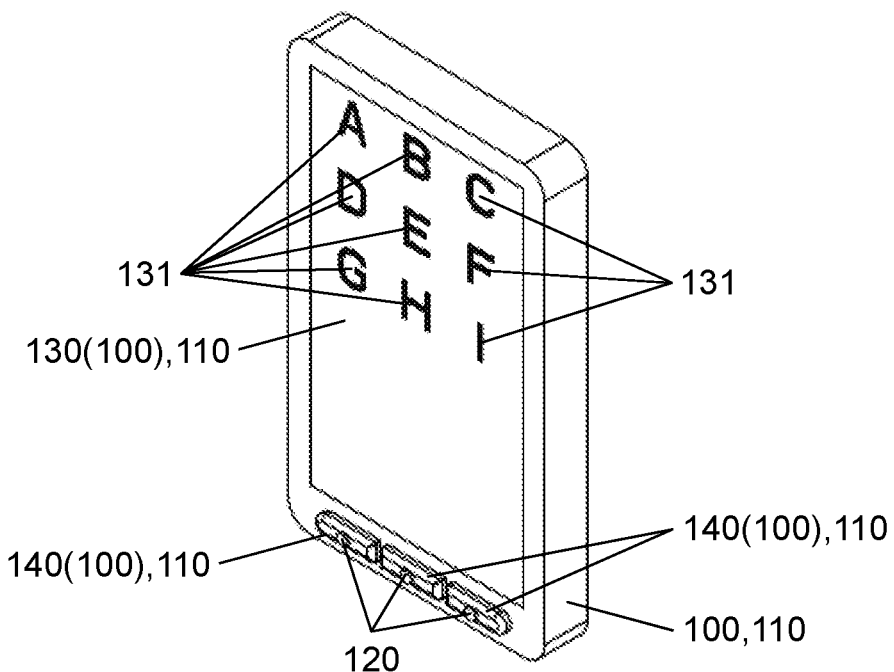
FIG. 6 is an external view of an electronic device with the configuration of the present disclosure (Example 3).

FIG. 6 is an example of an electronic device having a configuration generally identical to that of FIG. 5, but fluorescent coated film 120 is not applied on icons 131 displayed on touch panel display 130.

In common with FIG. 5 and FIG. 6, functional coated film 110 does not necessarily have to be applied over the entire surface of housing 100. However, functional coated film 110 must be applied to the areas where fluorescent coated film 120 is applied.

Any method may be used to form fluorescent coated film 120 as described above. Generally, the method of masking and applying the coating by spraying is considered. On the other hand, silk printing or pad printing can also be used. In situations where mass production does not need to be taken into consideration, the method using a brush or brushstroke is also acceptable.

The location where fluorescent coated film 120 is applied should be the one where functional coated film 110 is most likely to wear. For example, if the main cause of wear of functional coated film 110 is human touch, it is desirable to select a location that is easily touched by humans and apply fluorescent coated film 120 to the location. Specifically, when the electronic device in this embodiment has touch panel display 130 as shown in FIG. 5 and FIG. 6, it is desirable to apply fluorescent coated film 120 on operation icons 131 displayed on touch panel display 130. Operation icons 131 referred to here are, for example, a home icon, an application startup icon, an application close icon, and the like. Alternatively, if the electronic device in this embodiment has mechanical button 140 as shown in FIG. 5 and FIG. 6, it is also desirable to apply fluorescent coated film 120 on mechanical button 140. As another example, if the main cause of wear of functional coated film 110 is the sliding of the components of the electronic device, it is also desirable to apply fluorescent coated film 120 to the place where sliding is occurring. For example, if the electronic device in this embodiment is a device such as a charging table for a certain product, and there is a part that slides when the product is charged, the sliding part can be selected as the applying point of fluorescent coated film 120. Alternatively, if the electronic device in this embodiment is a portable device and it has a case for storage and sliding may occur between the storage case and the electronic device, the sliding point can be selected as the applying point of fluorescent coated film 120. Or, if the electronic device in this embodiment has a cable and the cable has a part to be slidden with mouthpiece, fluorescent coated film 120 is applied to either or both of the cable or the mouthpiece. In the case of the above example, the housing in the claim shall include the cable and mouthpiece.

On the other hand, by applying fluorescent coated film 120, functional coated film 110 is no longer the top surface, so the area where fluorescent coated film 120 is applied will lose its functionality. Therefore, the applying area of fluorescent coated film 120 should be made as small as possible.

Specifically, it is possible to find areas in the product that are relatively prone to wear and apply fluorescent coated film 120 to these areas in a discrete manner, as shown in FIG. 3 and FIG. 5, or in a linear manner, as shown in FIG. 4. In the example of FIG. 5, if it is found that the wear on mechanical button 140 is more severe than the wear on touch panel display 130, it is possible to apply fluorescent coated film 120 only on mechanical button 140 as shown in FIG. 6. In this case, the advantage of this method is that the functional coated film on touch panel display 130 will not be inhibited at all. Furthermore, if the part of the product that is most susceptible to wear is obvious, fluorescent coated film 120 can be applied only to that part as shown in FIG. 1, so that the lack of functionality of functional coated film 110 can be minimized.

[1-2. Operation]

The following is a description of the operation of the electronic device configured as described above.

When a user handles an electronic device, wear of functional coated film 110 and fluorescent coated film 120 is assumed to occur for some reason. The causes of wear referred here include contact by the user, sliding wear between components, sliding wear between other products, and so on. For any of these reasons, both functional coated film 110 and fluorescent coated film 120 wear. But since fluorescent coated film 120 is on the more superficial layer, it wears first. Preferably, the wear resistance of fluorescent coated film 120 should be weaker than the wear resistance of functional coated film 110, so that fluorescent coated film 120 will certainly wear out first. As a means of making the wear resistance of fluorescent coated film 120 weaker than that of functional coated film 110, it is possible to select such a coating film originally. In addition to selecting such a coating film, it is also possible to achieve this by making the thickness of fluorescent coated film 120 thinner than that of functional coated film 110.

After the electronic device in this embodiment is put into use, fluorescent coated film 120 is periodically irradiated with ultraviolet light using a black light or the like. Here, "periodically" may mean every month, for example, or for a shorter or longer period. Since the degree of wear varies according to the frequency of use of the electronic device, it may be determined by the user as appropriate. If it is determined that even a portion of fluorescent coated film 120 has disappeared due to UV irradiation, it can be determined that functional coated film 110 may have lost its function due to wear, and therefore the timing for re-applying functional coated film 110 can be determined.

Below shows how to confirm that fluorescent coated film 120 is missing. Regardless of the shape of applying fluorescent coated film 120, it is possible to confirm the difference by taking photographs or other images of the film in the state before it is put into use. Alternatively, it is also possible to prepare a jig for checking, in which holes are made only in the areas where fluorescent coated film 120 is applied. On the other hand, if fluorescent coated film 120 is applied in a regular manner as shown in FIG. 3 and FIG. 4, it is not necessary to take the aforementioned approach. It is possible to determine the defect based on its regularity. Therefore, although it was mentioned that the shape of applying fluorescent coated film 120 does not necessarily have to be regular, it has the advantage of confirmation if the coating is applied in a regular manner.

Below discusses the case when fluorescent coated film 120 is found to be missing and functional coated film 110 needs to be reapplied. The re-applying of functional coated film 110 can be applied over the already applied functional coated film 110 and the already applied fluorescent coated film 120. It is also possible to determine when the next re-applying should be done by applying an additional fluorescent coated film on the re-applied functional coated film.

[1-3. Effects and the Like]

As described above, the electronic device can determine the degree of wear of functional coated film 110 by observing the degree of wear of fluorescent coated film 120 while maintaining sufficient functionality of functional coated film 110.

Second Exemplary Embodiment

A second exemplary embodiment will be described below. The same parts as in a first exemplary embodiment are marked with the same sign, and the explanation is omitted.

[2-1. Configuration]

The configuration of the electronic device in this second embodiment is the same as that in first embodiment. However, for functional coated film 110 in this second embodiment, it is assumed that it functions by being touched by a person. In this case, it is mainly considered that the main cause of wear of functional coated film 110 is also touch of a person's finger. In this second embodiment, functional coated film 110 has an antibacterial function and is applied to the entire touch panel display 130, as an example. The functional coated film with antibacterial performance is specifically a glass coating agent, a resin coating agent, etc. that contains metal particles (Ag, Cu, etc.) having antibacterial and antiviral performance. And in this second embodiment, when fluorescent coated film 120 is applied to only one point as shown in FIG. 1, it is assumed as an explanation example that fluorescent coated film 120 is applied to the approximate center point of the home icon on the touch panel display. When fluorescent coated film 120 is applied to multiple points in the form of dots as shown in FIG. 3, it is assumed as an explanation example that fluorescent coated film 120 is applied to the approximate center point of the application startup icon on the touch panel display. When fluorescent coated film 120 is applied in a grid pattern as shown in FIG. 4, it is assumed as an explanation example that fluorescent coated film 120 is applied to connect the approximate center points of the application startup icon on the touch panel display.

Here, for the dotted fluorescent coated film 120 in FIG. 1 and FIG. 3, it is desirable that each dot is less than the size of a human finger. This is because the area where fluorescent coated film 120 is applied does not have antibacterial performance. On the other hand, as described in first embodiment, since the defect of fluorescent coated film 120 is confirmed by visual inspection under UV irradiation, the minimum size should be a visible size. However, if a loupe or the like is used in conjunction with the UV irradiation for confirmation, the minimum dimensions are not limited to the above. For the multiple dot-shaped fluorescent coated film 120 in FIG. 3, it is desirable that the distance between each dot is larger than the size of a human finger.

Specifically, the minimum dimension of each dot should be 1 mm or more, the maximum dimension should be 10 mm or less, preferably 5 mm or less, and the spacing between each dot should be 10 mm or more, preferably 20 mm or more. However, these values do not limit the claims.

Similarly, for the grid-shaped fluorescent coated film 120 in FIG. 4, each line width should be visible, but narrower than the size of a human finger, the spacing between each line should be wider than the size of a human finger.

Specifically, the minimum dimension of each line width should be 1 mm or more, the maximum dimension should be 10 mm or less, preferably 5 mm or less, and the distance between each line should be 10 mm or more, preferably 20 mm or more. However, these values do not limit the claims.

In addition, the total applying area of fluorescent coated film 120 should be set to be 1% or less of the total applying area of functional coated film 110. In the case of FIG. 1, this means that the area of fluorescent coated film 120 is 1% or less of the area of functional coated film 110. On the other hand, in the case of FIG. 3, it means that the total area of all the dots of fluorescent coated film 120 is less than 1% of the area of functional coated film 110. In the same way, in the case of FIG. 4, this means that the total area of fluorescent coated film 120 applied in a grid pattern is 1% or less of the area of functional coated film 110.

[2-2. Effects and the Like]

As described above, a case in which the main cause of wear of fluorescent coated film 120 is due to a person touching it with a finger was described. This configuration makes it possible to provide a method for determining the degree of wear of functional coated film 110 while maintaining the functionality of functional coated film 110 even in a situation where a person touches the film with a finger.

In addition, in this embodiment, the total applying area of fluorescent coated film 120 is less than 1% of the total applying area of functional coated film 110. This is in accordance with the antimicrobial performance standard in the antimicrobial test described in ISO 22196. This is the minimum requirement to be met in order to obtain an antimicrobial activity value of 2.0 or higher. In other words, if the area of the fluorescent coated film exceeds 1%, it is difficult to meet the antimicrobial performance standard of ISO 2196. On the other hand, even if the area of the fluorescent coated film is less than 1%, it is not guaranteed to meet the antimicrobial performance criteria of ISO 2196.

In addition, the following measures can be taken to increase the possibility of meeting the antimicrobial performance criteria of ISO 22196. In ISO 22196, antimicrobial performance is evaluated by preparing a 50 mm square test piece. Therefore, it is desirable to ensure that when an arbitrary 50 mm square is cut out from the area where functional coated film 110 is applied, the area of the contained fluorescent coated film 120 is less than 1% of the total area.

This makes it possible to determine the degree of wear of functional coated films while maintaining sufficient functionality, including the possibility of meeting ISO standards, especially for functional coated films with antimicrobial performance.

Third Exemplary Embodiment

A third exemplary embodiment will be described below. The same parts as in a first exemplary embodiment are marked with the same sign, and the explanation is omitted.

[3-1. Configuration]

The configuration of the electronic device in this third exemplary embodiment is identical to that in the first exemplary embodiment. However, functional coated film 110 shall be what is not shown in second exemplary embodiment. That is, the functionality of functional coated film 110 is other than that functions when people touch it with their finger. Specifically, functional coated film 110 is a flame retardant coating, etc. In this third exemplary embodiment, the electronic device has the configuration shown in FIG. 1, FIG. 3, or FIG. 4, functional coated film 110 is a flame-retardant coating, fluorescent coated film 120 is not flame-retardant, and fluorescent coated film 120 is applied to include the points that are easily worn by sliding, as an example.

When an actual flammability test is conducted using an electronic device such as the example above, fluorescent coated film 120, which is located more toward the flame source than the flame-retardant coating, which is functional coated film 110, will be exposed to the flame source without the protection of functional coated film 110. In addition, since fluorescent coated film 120 is not flame-retardant, the larger the applying area of fluorescent coated film 120, the more unfavorable the flammability becomes. Therefore, it is desirable to keep the applying area of fluorescent coated film 120 as small as possible.

In the case of a flammability test, it is considered desirable to use the application method of FIG. 1 or FIG. 3 because flames are likely to propagate in the grid-like application method shown in FIG. 4. However, if the direction in which flames are likely to propagate is known, it is possible to apply fluorescent coated film 120 in such a way that lines are not drawn in one direction.

[3-2. Effects and the Like]

As described above, using flame-retardant coatings as an example, electronic device which the degree of wear of functional coated film 110 can be determined while sufficiently maintaining the functionality of functional coated film 110 was described.

What is claimed is:

1. An electronic device including fluorescent paint, the electronic device comprising:
   a housing;
   a first functional coated film applied on a surface of the housing, the first functional coated film being transparent and having a function; and
   a first fluorescent coated film including transparent fluorescent paint and applied on a part of the first functional coated film, wherein
   the part of the first functional coated film is to be worn and to be touched by a human,
   the housing includes a touch panel display configured to display an operation icon,
   the first fluorescent coated film is applied on the operation icon,
   the operation icon is one of a home icon, an application startup icon, or an application close icon,
   the first functional coated film is antibacterial, and
   the first fluorescent coated film is weaker in wear resistance than the first functional coated film.

2. The electronic device according to claim 1, wherein the housing includes a mechanical button, and
   the first fluorescent coated film is applied on the mechanical button.

3. The electronic device according to claim 1, wherein an area of the first fluorescent coated film is equal to or less than one percent of an area of the first functional coated film.

4. The electronic device according to claim 3, wherein the housing includes a touch panel display and a mechanical button,
   the first functional coated film, which is antibacterial, is applied on both the touch panel display and the mechanical button, and
   the first fluorescent film is applied only on the mechanical button.

5. The electronic device according to claim 1, wherein the first functional coated film is flame retardant.

6. The electronic device according to claim 1, wherein the first fluorescent coated film has a dot shape.

7. The electronic device according to claim 1, wherein the first fluorescent coated film has a linear shape.

8. A method of inspecting the first fluorescent coated film of the electronic device according to claim 1,
   the method comprising irradiating, by a blacklight, ultraviolet rays to both the first functional coated film and the first fluorescent coated film of the electronic device.

9. The electronic device according to claim 1, further comprising:
   a second functional coated film applied over the first functional coated film and the first fluorescent coated film in a case when the first fluorescent coated film is found to be missing; and a second fluorescent coated film applied on the second functional coated film and over the part of the first functional coated film.

\* \* \* \* \*